Jan. 14, 1930.　　　D. B. WAITE　　　1,743,411
BRAKE
Filed Jan. 16, 1928　　2 Sheets-Sheet 1

INVENTOR.
Donald B. Waite
BY
P. N. Pomeroy
ATTORNEY

Jan. 14, 1930.                D. B. WAITE                1,743,411
                                 BRAKE
                      Filed Jan. 16, 1928          2 Sheets-Sheet 2

INVENTOR.
Donald B. Waite
BY P. M. Pomeroy
ATTORNEY

Patented Jan. 14, 1930

1,743,411

UNITED STATES PATENT OFFICE

DONALD B. WAITE, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed January 16, 1928. Serial No. 247,213.

This invention relates to brake shoes and particularly to shoes of the internal-expanding type, the principal object being to form a brake shoe from a single piece of metal to provide the same with an arcuate lining supporting plate and a pair of spaced radial reinforcing webs.

Another object is to provide a brake shoe comprising an arcuate plate and a pair of spaced radial reinforcing webs positioned inwardly from the marginal edges of the plate and integrally connected with the marginal edges, the spaced webs forming the sole reinforcing means for the arcuate plate.

A further object is to provide a brake shoe comprising an arcuate plate and a pair of spaced reinforcing webs forming the sole radial reinforcing means for the plate, positioned inwardly from the side edges of the plate and integral therewith, the plate being of single thickness of metal between the webs and of double thickness of metal outwardly of the webs.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a section through a vehicle brake taken just inside the head thereof showing the brake shoes in elevation.

Figure 1:
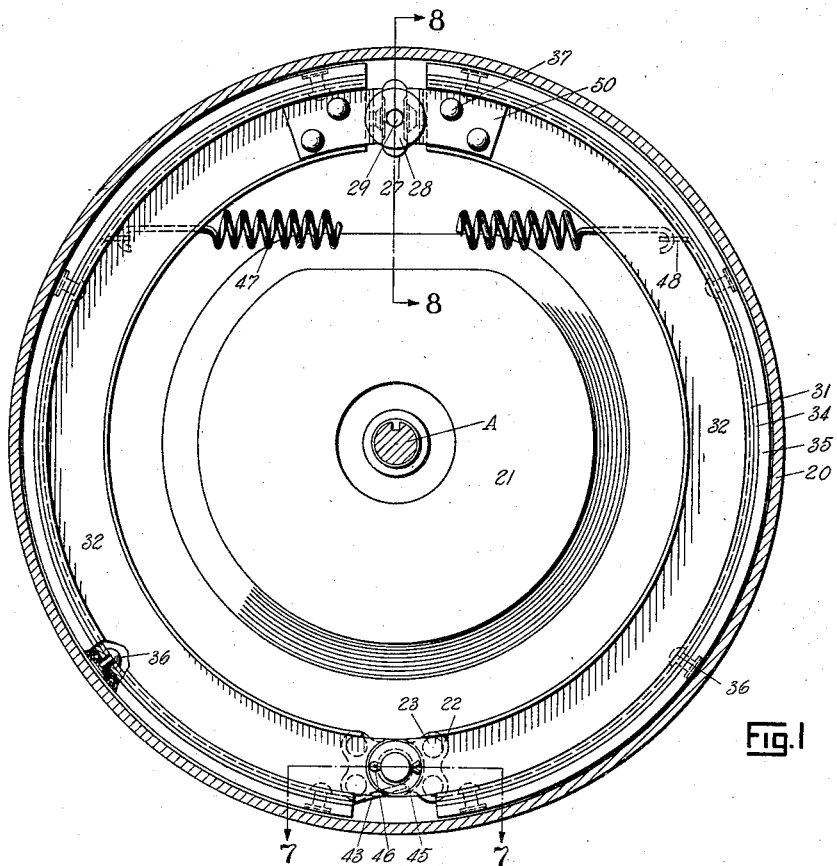
Figure 2:
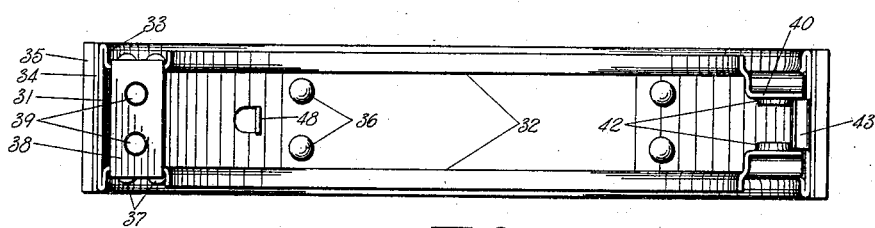
Figure 2 is a plan view of one of the brake shoes looking toward the concave surface thereof.

Referring to the accompanying drawings in which like numerals refer to like parts throughout the several views, the vehicle brake chosen for illustration comprises a brake drum 20 mounted upon a vehicle wheel or propeller shaft A, and a dust cover or backing plate 21 adjacent to the open end of the drum 20. The backing plate 21 is rigidly secured to some stationary part of the vehicle (not shown) and forms a support for the various parts of the brake mechanism. A bracket 22 is secured by rivets 23 or other suitable means to the backing plate 21 to receive and support the brake shoe anchor pin 24. The brake shoes which will be described in detail later in the specification are pivotally supported at adjacent ends by the common anchor pin 24.

Figure 8:
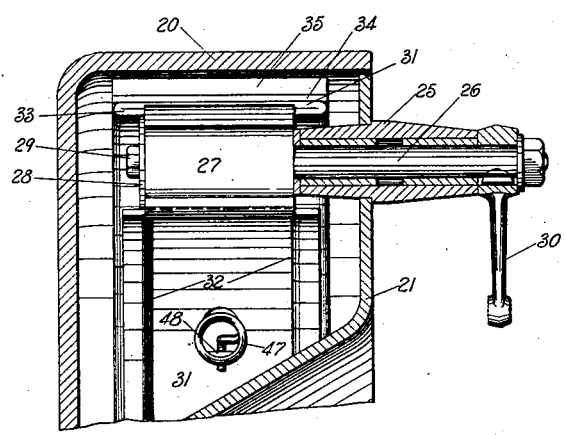
Figure 8 is an enlarged section taken on the line 8—8 of Figure 1 showing the brake operating cam.
Figure 4:
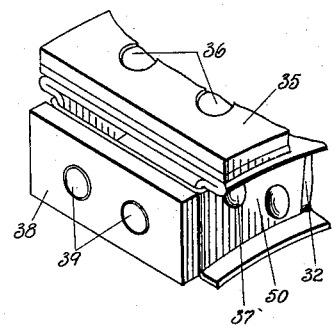
Figure 4 is an enlarged fragmentary perspective view of the cam contact end of the brake shoe.

As shown in Figures 1 and 8, a bracket 25 is secured to the backing plate at 180 degrees from the anchor pin 24 to support a rotatable shaft 26 which is journaled therein. This shaft 26 carries a cam 27 at one end which contacts with the free ends of the brake shoes and which is held on the shaft 26 by a washer 28 and a cap screw 29 threaded into the shaft 26. The other end of the shaft 26 projects past the bracket 25 and has a lever 30 secured thereto which is connected by some suitable means to a brake pedal or hand lever (not shown).

Figure 3:
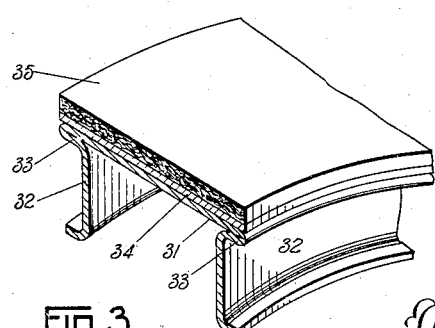
Figure 3 is an enlarged fragmentary perspective view of one of the brake shoes showing the same in section.

The brake shoes are formed from a single piece of sheet metal to provide a construction which is very rigid, light in weight, and economical to manufacture. Each shoe is blanked from a single flat piece of sheet metal to a partly formed shape. The partly formed shoe is then rolled or formed in any other suitable manner to the shape shown in Figure 3, providing the same with a pair of spaced radial channel-shaped webs 32 facing back to back, and an arcuate portion 31 integrally joined at its side marginal edges with the marginal edges of the upper outwardly-extending flanges 33 of the webs 32. The upper flanges 33 of the webs 32 abut against and are preferably welded or otherwise secured to the concave surface of the arcuate portion 31 whereby the channel-shaped webs 32 form the sole radial reinforcing means for the brake shoe.

The brake shoe may be further reinforced if desired by riveting, bolting, welding or otherwise securing an arcuate band 34 to the convex surface of the arcuate portion 31. The brake shoe friction facing 35 may be secured by rivets 36 to the reinforcing band 34, but it is to be understood however, that the friction facing 35 may be secured if desired, directly to the arcuate portion 31 without the use of the reinforcing band 34.

Figure 5:
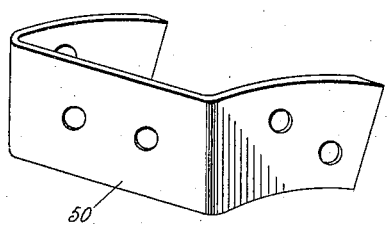
Figure 5 is an enlarged perspective view of the stamping to which the cam contact plate is secured.

The free end of cam contact end of the brake shoe has a U-shaped stamping 50 (shown in Figure 5) secured thereto by rivets 37 or other suitable means to the outer faces of the webs 32. A hardened steel cam contact plate 38 is shown as being secured by rivets 39 to the radial outer face of the stamping 30, however it may be welded or removably bolted to the U-shaped stamping 50 if desired.

Figure 7:
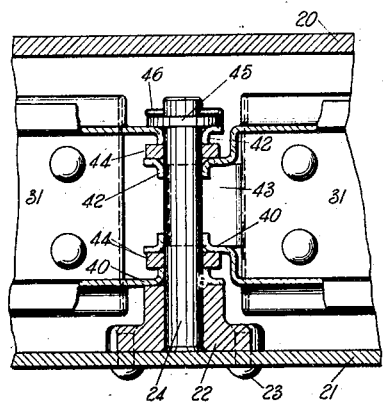
Figure 7 is an enlarged section taken on the line 7—7 of Figure 1 showing the brake shoes anchored to a common anchor pin.
Figure 6:
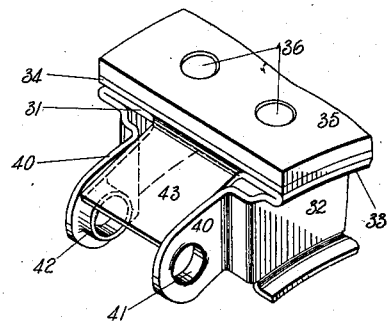
Figure 6 is a fragmentary perspective view showing the anchored end of one of the brake shoes.

The anchored end of each brake shoe as shown in Figure 6, is preferably formed by extending the bases of the channel-shaped webs 32 beyond the flanges thereof to form a pair of spaced tongues 40, each tongue being formed with an opening 41 in axial alignment with an opening in the other tongue. The metal surrounding each opening 41 is preferably bent inwardly to provide an integral bushing 42. As shown in Figures 6 and 7, the projecting tongues 40 of one of the brake shoes are offset from the webs 32 toward each other and a strip of metal 43 forming a part of the arcuate portion 31 is extended and bent downwardly to abut against the bushings 42 and against the sides of the tongues 40 in order to hold the same in spaced relationship thereby preventing relative inward movement of the tongue 40.

The tongues 40 of the two shoes are telescoped with each other and positioned on the common anchor pin 24 with washers 44 positioned between the edges of the bushings 42 of the outer tongues and the outer faces of the inner tongues to allow unobstructed relative pivotal movement of the brake shoes. A washer 45 and a cotter pin 46 extending through the end of the pivot pin 24 hold the brake shoes against movement longitudinally of the pivot pin 24.

A coil spring 47 having its ends hooked through lips 48 struck inwardly from the arcuate portions 31 normally holds the brake shoes out of engagement with the brake drum 20 and draws the free ends of the same toward each other so that the cam contact members 38 engage opposite sides of the brake shoe operating cam 27.

From the foregoing description, it is readily apparent that a brake shoe is provided which is very rigid in construction, light in weight and economical to manufacture. It is further apparent that the arcuate lining supporting portion is formed with radial reinforcing webs forming the sole radial reinforcing means therefor, which webs are integral therewith, thereby tending to give added strength and rigidity to the brake shoe structure.

Formal changes may be made in the specific embodiment of the invention described without departing from the spirit and substance of the broad invention, the scope of which is commensurate with the appended claims.

What I claim is:

1. A brake shoe comprising an arcuate plate and a pair of spaced radial webs forming the sole radial reinforcing means therefor positioned inwardly from the side edges of said plate and integral therewith, said plate being of single thickness of metal between said webs and of double thickness of metal outwardly of said webs.

2. A one-piece brake shoe comprising two spaced arc-shaped portions of channel-shaped section forming the sole radial reinforcing means for said shoe, and an arcuate plate conforming and integral with the free outer faces of the upper flanges of said semi-circular portions.

3. A one-piece brake shoe comprising two spaced outwardly-facing arc-shaped channel members forming the sole radial reinforcing means for said shoe, and an arcuate plate abutting against the free faces of the upper flanges of said channel members and having its marginal edges integrally connected with the marginal edges of said flanges.

4. A brake shoe comprising two spaced semi-circular channel-shaped portions forming the sole radial reinforcing means for said shoe, a semi-circular plate formed integral with the upper flanges of said channel members abutting against the free faces thereof, a semi-circular reinforcing band secured to said plate, and brake friction facing secured to said band.

5. A brake shoe comprising an arcuate plate, a pair of spaced radial webs forming the sole radial reinforcing means therefor positioned inwardly from the marginal edges of said plate and integrally connected with said edges, spaced tongues at one end of said shoe integral with said webs extending beyond said arcuate plate and having aligned openings therein, the metal surrounding said openings being flanged inwardly to provide bushings integral with said tongues.

6. A brake shoe comprising an arcuate plate, a pair of spaced radial channel members forming the sole radial reinforcing means therefor positioned inwardly from the marginal edges of said plate and integrally connected with said edges, spaced tongues at one end of said shoe integral with said channel members extending beyond said arcuate plate having openings therein flanged inwardly to provide bushings integral with said tongues, and a metal strip integral with said arcuate plate abutting against said bushings and the inner sides of said tongues to hold said tongues in spaced relationship.

7. A one-piece brake shoe comprising an arcuate plate, a pair of spaced radial webs forming the sole radial reinforcing means therefor positioned inwardly from the marginal edges of said plate and integrally connected with said edges, a U-shaped stamping secured to the sides of said radial webs to abut against adjacent ends thereof, and a cam contact member secured to said U-shaped stamping.

8. A brake shoe comprising an arcuate plate terminating at each side edge in a reversely bent portion and having a pair of spaced radial webs integrally connected with said reversely bent portions to form the sole radial reinforcing means for said shoe.

9. A brake shoe comprising an arcuate plate, a pair of spaced radial webs forming the sole radial reinforcing means therefor positioned inwardly from the marginal edges of said plate and integrally connected with said edges, a member extending between said webs and having portions secured thereto, and a cam contact member secured to said first member.

10. A brake shoe comprising an arcuate plate, a spacing member extending beyond an end of said plate, a pair of spaced radial webs forming the sole radial reinforcing means for said plate positioned inwardly from the marginal edges thereof and integrally connected with said edge, and spaced tongues at one end of said shoe integral with said webs extending beyond said arcuate plate into contacting relationship with said spacing member, the metal surrounding said opening being flanged to provide bushings integral with said tongues.

11. A one-piece brake shoe comprising an arcuate plate, a pair of spaced radials webs forming the sole radial reinforcing means therefor integrally connected with the marginal edges of said plate, and spaced tongues at one end of said shoe integral with said webs extending beyond said arcuate plate and having aligned openings therein, the metal surrounding said openings being flanged to provide bushings integral with said tongues.

12. A one piece brake shoe comprising an arcuate plate and a pair of spaced webs forming radial reinforcing means therefor, having in combination therewith, a U-shaped member comprising a support for a cam contact member secured to said radial webs inwardly of the marginal edges of said plate.

Signed by me at South Bend, Indiana, this 11th day of January, 1928.

DONALD B. WAITE.